(12) United States Patent
Izumi

(10) Patent No.: US 7,407,692 B2
(45) Date of Patent: Aug. 5, 2008

(54) CHIRAL NEMATIC LIQUID CRYSTAL COMPOSITION, LIQUID CRYSTAL DISPLAY DEVICE, AND PRODUCTION METHOD THEREOF

(75) Inventor: Tomoo Izumi, Toyonaka (JP)

(73) Assignee: Konica Minolta Holdings, Inc., Tokyo (JP)

(*) Notice: Subject to any disclaimer, the term of this patent is extended or adjusted under 35 U.S.C. 154(b) by 126 days.

(21) Appl. No.: 11/339,372

(22) Filed: Jan. 25, 2006

(65) Prior Publication Data

US 2006/0163535 A1  Jul. 27, 2006

(30) Foreign Application Priority Data

Jan. 27, 2005  (JP) ............................. 2005-019396

(51) Int. Cl.
*G03C 19/00* (2006.01)
*G03C 19/52* (2006.01)

(52) U.S. Cl. ........................... 428/1.1; 428/1.3; 430/20; 349/179; 252/299.01; 252/299.5; 252/299.7

(58) Field of Classification Search ................ 428/1.1, 428/1.3; 252/299.01, 299.5, 299.7; 430/20; 349/179

See application file for complete search history.

(56) References Cited

U.S. PATENT DOCUMENTS

| 6,074,710 | A | 6/2000 | Kato et al. |
| 6,333,081 | B1 * | 12/2001 | Horikiri et al. ............... 428/1.1 |
| 7,098,976 | B2 * | 8/2006 | Minoura et al. ............. 349/113 |
| 2005/0218376 | A1 * | 10/2005 | Izumi .................... 252/299.01 |

OTHER PUBLICATIONS

Liquid crystal vol. 4 No. 1 2000, Sections 5 -5.1, pp. 16-18, with partial English translation of Sections 5-5.1, pp. 1-2.
Figs. 6 (A-C) of present application filed Jan. 25, 2006 entitled "Chiral Nematic Liquid Crystal Composition, Liquid Crystal Display Device, and Production Method Thereof,".

* cited by examiner

*Primary Examiner*—Geraldina Visconti
(74) *Attorney, Agent, or Firm*—Brinks Hofer Gilson & Lione

(57) ABSTRACT

A chiral nematic liquid crystal composition, characterized in that a self-organizing type gelling agent is contained and the phase transition temperature between liquid crystal and isotropic phases is higher than the sol-gel transition temperature, a liquid crystal display device wherein the chiral nematic liquid crystal composition is put and held between a pair of substrates having an electrode, and a method for producing a liquid crystal display device wherein the chiral nematic liquid crystal composition is heated to a temperature of not lower than the phase transition temperature between liquid crystal and isotropic phases and then cooled down to room temperature.

18 Claims, 5 Drawing Sheets

(A)

(B)

(C)

CHIRAL NEMATIC LIQUID CRYSTAL COMPOSITION, LIQUID CRYSTAL DISPLAY DEVICE, AND PRODUCTION METHOD THEREOF

This application is based on application(s) No. 2005-019396 filed in Japan, the contents of which are hereby incorporated by reference.

BACKGROUND OF THE INVENTION

1. Field of the Invention

The invention relates to a chiral nematic liquid crystal composition, a liquid crystal display device, and the production method thereof.

2. Description of the Related Art

Liquid crystal display devices employing a chiral nematic liquid crystal composition containing an added chiral agent in its nematic liquid crystal that is in the cholesteric phase at room temperature have been known. Such liquid crystal display devices fundamentally have a chiral nematic liquid crystal composition put and held between a pair of substrates having a transparent electrode, and the display is performed by switching the liquid crystal between its planar (PL) state and the focal conic (FC) or homeotropic (Homeo) state while applying a high/low pulse voltage (driving voltage) between the electrodes. For example, the display is "bright" in the PL state because the light having a particular peak wavelength is selectively reflected and "dark" in the FC or Homeo state because the light is transmitted.

The liquid crystal display devices are generally produced by enclosing a liquid crystal composition between substrates at room temperature. In particular, when the fluidity of a liquid crystal composition is lower, the liquid crystal composition is known to be first heated for increase in fluidity and enclosed between substrates.

However, the contrast between the "bright" and "dark" states was not sufficiently high in the display devices above. Improvement in the visibility of display image is required.

On the other hand, a liquid crystal composition containing a ferroelectric liquid crystal (SCE8; phase transition temperature between liquid crystal and isotropic phases=102° C.) and a self-organizing type gelling agent that has a phase transition temperature between liquid crystal and isotropic phases higher than the sol-gel transition temperature of the gelling agent was disclosed (Liquid Crystal", Hiroshi Kato, published by the Japanese Liquid Crystal Society, 2000, Vol. 4, No. 1, pp. 17 to 18). Specifically, in the liquid crystal composition, the phase transition temperature between liquid crystal and isotropic phases is set to a temperature higher than the sol-gel transition temperature of the gelling agent; and in production of the liquid crystal display device, the liquid crystal composition is cooled down from a heated state to room temperature, while strictly controlling the conditions such as "rubbing during cell production" and "application of voltage after injection of liquid crystal". In this manner, the isotropic phase is converted to a liquid crystal phase (FIG. 6(A): isotropic phase, FIG. 6(B): liquid crystal phase), and the orientation of the liquid crystal molecules serves as a template and generates anisotropic linear orientation of the gelling agent molecules (FIG. 6(C): orientation of gelling agent molecules (black region)). Although the literature above describes only generation of a new type of molecular self-organization, it seems to be also effective for improving the shock-resistance and other properties of ferroelectric liquid crystal panels.

BRIEF SUMMARY OF THE INVENTION

The present invention is to provide a chiral nematic liquid crystal composition and a liquid crystal display device having a sufficiently large contrast between the "bright" and "dark" states, and a method of producing the same.

The present invention relates to a chiral nematic liquid crystal composition, comprising a self-organizing type gelling agent, wherein the phase transition temperature between liquid crystal and isotropic phases is higher than the sol-gel transition temperature, a liquid crystal display device wherein the chiral nematic liquid crystal composition is put and held between a pair of substrates having an electrode, and a method for producing a liquid crystal display device wherein the chiral nematic liquid crystal composition is heated to a temperature of not lower than the phase transition temperature between liquid crystal and isotropic phases and then cooled down to room temperature.

DETAILED DESCRIPTION OF THE INVENTION

The invention relates to a chiral nematic liquid crystal composition, comprising a self-organizing type gelling agent, wherein the phase transition temperature between liquid crystal and isotropic phases is higher than the sol-gel transition temperature.

The invention also relates to a liquid crystal display device, wherein the chiral nematic liquid crystal composition is put and held between a pair of substrates having an electrode.

The invention also relates to a method of producing a liquid crystal display device, characterized by heating the chiral nematic liquid crystal composition to a temperature of not lower than the phase transition temperature between liquid crystal and isotropic phases and then cooling it down to room temperature.

EFFECT OF THE INVENTION

The liquid crystal display device using the chiral nematic liquid crystal composition according to the invention has a sufficient contrast between the "bright" state (e.g., PL state) and the "dark" state (e.g., FC or Homeo state) and thus is superior in visibility.

PREFERRED EMBODIMENT OF THE INVENTION

Figure 1:
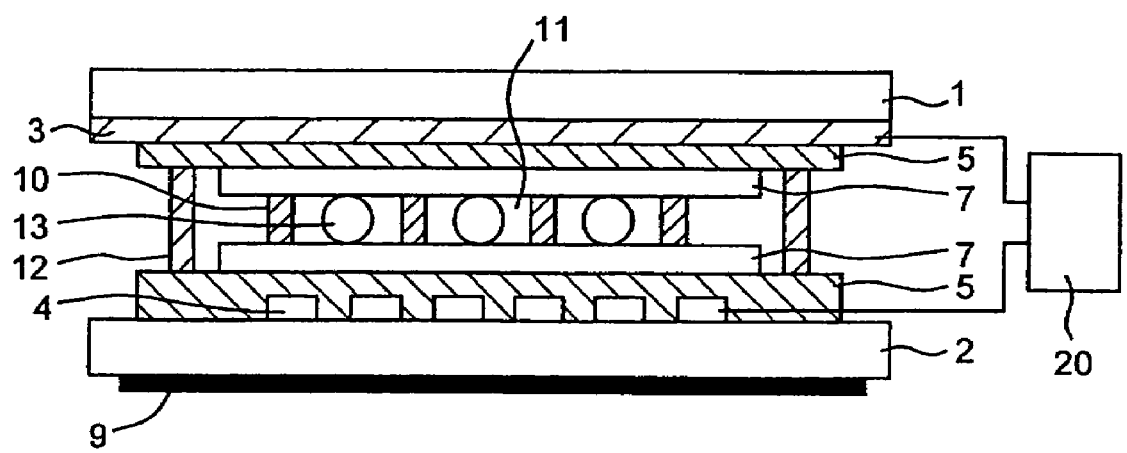
FIG. 1 is a schematic sectional view illustrating the liquid crystal display device of an embodiment of the invention.

FIG. 1 is a schematic view illustrating the cross-sectional structure of the liquid crystal display device in an embodiment of the invention. The liquid crystal display device shown in FIG. 1 has a structure wherein a liquid crystal composition 11 is put and held between a pair of substrates 1 and 2 respectively having electrodes 3 and 4. In FIG. 1, transparent electrodes 3 and 4 in the shape of multiple belts mutually in parallel are formed respectively on the surfaces of the substrates 1 and 2. The transparent electrode 3 and the transparent electrode 4 are placed as they face each other and the belts are in the directions perpendicular to each other. An insulating thin film 5 is coated on each of the electrodes 3 and 4. An orientation film 7 is formed additionally on the insulating thin film 5. The numeral 10 represents a polymer structure serving both as a spacing part and an adhesive part connecting the substrates, while the numeral 13 is a spacer serving similarly as a spacing part. The numeral 12 represents a sealing material enclosing the liquid crystal composition 11 inside the cell. A black visible light-absorbing layer 9 is formed as needed on the outer face (rear face) of the substrate 2 opposite to the incident light-side. Alternatively, a substrate 2 inherently absorbing visible light may be used instead of forming the visible light-absorbing layer 9.

Hereinafter, main components for the liquid crystal display device will be described in detail.

(Substrate)

In FIG. 1, both substrates 1 and 2 have light-transmitting property, but of a pair of substrates for use in the liquid crystal display device, at least one substrate (at least, incident-side substrate 1) should have light-transmitting property. Examples of the substrates having light-transmitting property include glass plates and flexible substrates of resins such as polycarbonate, polyether sulfone, polyarylate, and polyethylene terephthalate. Use of a flexible substrate is preferable, from the viewpoint of reduction in the weight of device. Use of a flexible substrate as at least one, preferably both, of the pair of substrates allow production of a light and thin device and are effective for suppression of damage (cracking).

(Electrode)

Examples of the electrodes 3 and 4 include transparent conductive films such as ITO (Indium Tin Oxide) and IZO (Indium Zinc Oxide), metal electrodes such as aluminum and silicon, photoconductive films such as amorphous silicon and BSO (Bismuth Silicon Oxide), and the like. As described above, in the liquid crystal display device shown in FIG. 1, transparent electrodes 3 and 4 in the shape of multiple belts mutually in parallel are formed respectively on the surface of the transparent substrates 1 and 2, and these electrodes 3 and 4 are placed so that they may face each other with the belts mutually in the perpendicular directions. Such an-electrode can be formed, for example, by depositing an ITO film with a mask on a substrate by sputtering or the like, or forming an ITO film on the entire surface and then patterning the film by photolithography.

(Insulating Thin Film)

Although not required in principle, an insulating thin film 5 is preferably formed on at least one of the electrodes 3 and 4 for prevention of short-circuiting between the electrodes and improvement in the reliability of gas barrier properties of the liquid crystal display device. Examples of the insulating thin films 5 include inorganic films such as silicon oxide, titanium oxide, and zirconium oxide or the alkoxides thereof; organic films such as polyimide resin, epoxy resin, acrylic resin, and urethane resin; and the like. The insulating thin film can be formed by any one of known methods such as vapor deposition, spin coating, and roll coating, by using the material above. The insulating thin film may be formed with the same polymer resin for use as the polymer structure.

(Orientation Film)

The orientation film 7 is not essential in principle, but the presence thereof is preferable for stabilization of the device. When there is an insulating thin film previously formed on an electrode, an orientation film is formed on the insulating thin film, while when there is no insulating thin film on the electrode, it is formed on the electrode. Examples of the orientation films 7 include organic films such as polyimide resin, silicone resin, polyamide-imide resin, polyether imide resin, polyvinylbutyral resin, and acrylic resin; inorganic films such as silicon oxide and aluminum oxide; and the like. The orientation film formed with the above material may be treated, for example, by rubbing. The orientation film may be formed with the same polymer resin for use as the polymer structure.

(Spacer)

Spacer 13 for maintaining the gap uniformly between the substrates is placed between the pair of substrates. Examples of the spacers include spherical particles of resin or inorganic oxide, more specifically, ball-shaped glass, ceramic powders, and spherical particles of organic material. Retention spacers having a thermoplastic resin coated on the surface are also used favorably. It is preferable to install both the spacer 13 and the polymer structure 10 for maintaining the gap between substrates more uniformly as shown in FIG. 1, but only one of them may be installed. When the polymer structure is formed, the diameter of the spacer is not larger than the height of the polymer structure, and the diameter and the height are made identical with each other after completion of the device. Independent of whether there is the polymer structure, the diameter of the spacer is identical with the cell gap, i.e., the thickness of the liquid crystal layer of liquid crystal composition 11.

(Liquid Crystal Composition)

The liquid crystal composition 11 is a chiral nematic liquid crystal composition characterized in that a self-organizing type gelling agent is contained and that the phase transition temperature between liquid crystal and isotropic phases (hereinafter, referred to as $T_{CN-I}$ (° C.)) is higher than the sol-gel transition temperature (hereinafter, referred to as $T_{S-G}$ (° C.)). A preferable liquid crystal composition 11 has a $T_{CN-I}$ and a $T_{S-G}$ satisfying the following relationship:

$$5 \leq T_{CN-I} - T_{S-G},$$

in particular, $$10 \leq T_{CN-I} - T_{S-G}.$$

A liquid crystal composition having the $T_{CN-I}$ and $T_{S-G}$ satisfying the relationships above has a sufficiently large contrast between the "bright" and "dark" states and an improved visibility. The mechanism for the advantageous effects is not clear yet, but seems to be the followings: In the case where a liquid crystal composition satisfies the relationships of $T_{CN-I}$ and $T_{S-G}$, when the liquid crystal composition is heated and then cooled in the production process for the liquid crystal display device, the transfer from isotropic phase to liquid crystal phase and then the transfer from sol state to gel state occurs in succession. In this embodiment wherein a chiral nematic liquid crystal is used, the gelation at the time gives a non-anisotropic network structure effectively, and each hole (small compartment) in the network structure has a shape compatible with the orientation of the liquid crystal molecule. Presumably for that reason, it is possible to control the orientation of the liquid crystal molecules in each of the holes (small compartments) in the network structure with operational voltage and improve the contrast of device. If the network structure is not formed, the chiral nematic liquid crystal, which is subjected only to the regulation from the orientation film or from the electrode if there is no orientation film, has a decreased contrast. Even if the network structure is formed, the holes (small compartments) in the structure do not have a shape compatible with the orientation of the liquid crystal molecules, and thus, the liquid crystal molecules in the holes (small compartments) do not orient according to the operational voltage and the device has a decreased contrast. For example, if $T_{CN-I}$ is not larger than $T_{S-G}$, the gelling agent molecules aggregate more easily and does not give a network structure easily. Even if the network structure is formed, the transition to the liquid crystal phase occurs after the gelation by cooling, and thus, the respective holes (small compartments) in the network structure do not have a shape compatible with the orientation of the liquid crystal molecule.

In addition, when cooled from the isotropic phase and converted to the liquid crystal state, the chiral nematic liquid crystal forms a great number of microregions, called domains, wherein the liquid crystal is oriented uniformly. Gelation after complete formation of the domains seems to give a more favorable network structure. From the viewpoint of formation of such domains, this embodiment is significantly different from a nematic liquid crystal. That is, the nematic liquid crystal forms one domain in its entire liquid crystal region, and thus the liquid crystal domain seems to give no influence on network formation, in contrast to the chiral nematic liquid crystal. In addition, there is no need for an initial strict orientation treatment in the present embodiment. It is because an isotropic network shape is desirable, on the basis of displaying principle. The present embodiment is also different from the Nonpatent Literature 1 in this point.

The $T_{CN-I}$ and $T_{S-G}$ of a liquid crystal composition can be determined by differential scanning calorimetry (DSC analysis). More specifically, the endotherm of the liquid crystal composition sample was determined by heating it once to a temperature of 150° C. and then cooling it at a descending speed of 5° C./min. There were two peaks observed. Separately, the $T_{CN-I}$ and $T_{S-G}$ of the composition were determined without addition of the gelling agent. When the two results were compared, $T_{CN-I}$ was in conformity with the higher peak between the two peaks at an accuracy of ±0.5° C. The peak with that was not in conformity was $T_{S-G}$. The $T_{CN-I}$ and $T_{S-G}$ are normally determined respectively with a certain range, and in such a case, $T_{CN-I}$ and $T_{S-G}$ satisfy the relationships above, with the median values of the range.

The peak in the DSC curve is a point where the slope of the tangent line of curve changes from positive or negative to negative or positive when the temperature is lowered.

In producing the liquid crystal composition by mixing a gelling agent, a nematic liquid crystal and a chiral agent, the kinds, combination, and contents of respective components are adjusted in such a manner that $T_{CN-I}$ and $T_{S-G}$ satisfy the relationships above.

For example, use of a nematic liquid crystal having a relatively high phase transition temperature between the nematic liquid crystal phase and isotropic phases (hereinafter, referred to as $T_{N-I}$) results in increase of $T_{CN-I}$. On the other hand, use of a nematic liquid crystal having a relatively lower $T_{N-I}$ results in decrease of $T_{CN-I}$.

Addition of a chiral agent likely leads to decrease of $T_{CN-I}$, but use of a chiral agent having a greater molecular weight, for example, leads to smaller deviation of the $T_{CN-I}$ from the $T_{N-I}$ point. A chiral agent having a smaller molecular weight leads to decrease of $T_{CN-I}$. For example, use of a chiral agent having a greater helical twist power (property of twisting liquid crystal) prevents lowering of $T_{CN-I}$, as it can be used in a smaller addition amount.

The gelling agent used in the present embodiment is a self-organizing type, more specifically an agent that organizes itself into a pseudo-network structure only by addition and mixing without any other means such as UV irradiation. Addition of the self-organizing type gelling agent enables reduction of the fluidity of the cholesteric liquid crystal containing a nematic liquid crystal and a chiral agent and increase of the viscosity thereof over that before addition without any other means. The liquid crystal display device in the present embodiment has an improved contrast, because of the presence of such a self-organizing type gelling agent. The mechanism for such advantageous effects is not clear yet, but seems to be that the network structure of the gelling agent molecule, which is dispersed in the liquid crystal composition uniformly at the molecule level forming a pseudo-network structure by hydrogen bond, has higher denseness and favorable flexibility. In addition, compared to the method of improving contrast by raising the reflectance of light in a wide wavelength region, the method does not demand increase in cell gap and thus allows operation at a lower applied voltage and gives a greater freedom in selecting the materials. Further, the device characteristically allows display at a wider view angle than the devices containing no gelling agent.

The self-organizing type gelling agent is an organic compound forming a hydrogen bond between the same molecules, for example, an organic compound containing at least one intermolecular hydrogen-bonding group, preferably an organic compound having an intermolecular hydrogen-bonding group and an alkylene group. Use of an organic compound containing an intermolecular hydrogen-bonding group as well as an alkylene group as the gelling agent accelerates formation of the pseudo-network structure by the intermolecular force between the alkylene groups.

The intermolecular hydrogen-bonding group is not particularly limited, when the molecules containing the group can form hydrogen bonds with each other, and examples thereof include an amide bonding group (—NHCO—) and the like.

One or more, preferably two or more, intermolecular hydrogen-bonding groups are preferably contained in the molecule.

The alkylene group is a long chain alkylene group (hereinafter, referred to as Re), and specifically, a bivalent saturated hydrocarbon group having 4 or more carbons, preferably 6 to 20 carbons and preferably a straight-chain polymethylene group (—(CH$_2$)$_n$—).

One or more, preferably two or more, alkylene groups are preferably contained in the molecule.

The gelling agent is not particularly limited in its structure, when it is an organic compound having at least one intermolecular hydrogen-bonding group, and it is preferably an organic compound having one intermolecular hydrogen-bonding group and one alkylene group.

Examples of the gelling agents include the alicyclic amide compounds represented by the following Formula (I), the aliphatic amide compounds represented by the following Formulae (II) to (IV), and the aliphatic urea compounds represented by the following Formula (V), and the like.

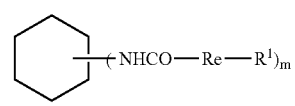

(I)

-continued

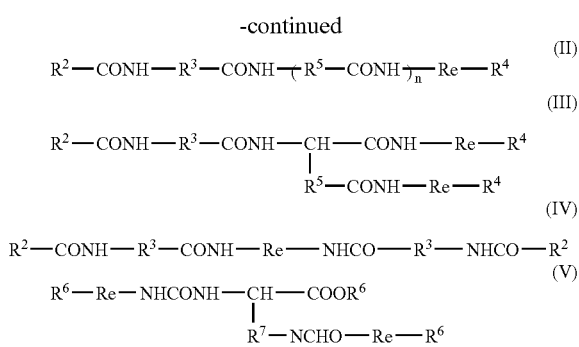

In Formula (I), $R^1$ represents an alkyl, aryloxy or arylalkoxy group; and may have one or more substituents such as a cyano group.

The alkyl group is an alkyl group having 1 to 3 carbons, such as methyl, ethyl, n-propyl, and sec-propyl.

The aryloxy group is an aryloxy group having 6 to 14 carbons, such as phenyloxy, biphenyloxy, and naphthyloxy.

The arylalkoxy group is a monovalent alkoxy group having 1 to 3 carbons that is substituted with one or two substituent aryl groups having 6 to 14 carbons, such as phenylmethoxy, phenylethoxy, phenylpropoxy, biphenylmethoxy, biphenylethoxy, and biphenylpropoxy.

$R^1$ is preferably an alkyl group or an aryloxy group.

Re is a group similar to the long chain alkylene group (Re) described above and the preferable groups are also the same as those of Re.

m is an integer of 1 to 3 and preferably 2.

When there are plural same groups in a structure, each of the groups may be selected independently from the groups in a particular range (the same shall apply hereinafter).

Preferable typical examples of the alicyclic amide compounds (I) include the following compounds:

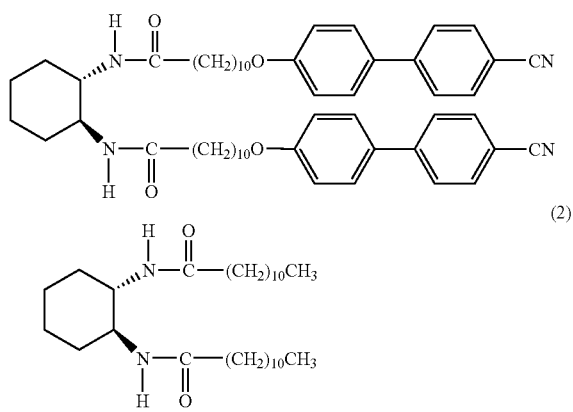

In Formulae (II) to (IV), the groups common to each other are the identical groups.

$R^2$ is the group identical with $R^1$ above. $R^2$ is preferably an arylalkoxy group.

$R^3$ is a bivalent alkylene group having 1 to 3 carbons, such as methylene, dimethylene, and trimethylene. $R^3$ may have a substituent group, examples of which are listed below, and among them, preferable is a branched alkylene group having 3 to 5 carbons.

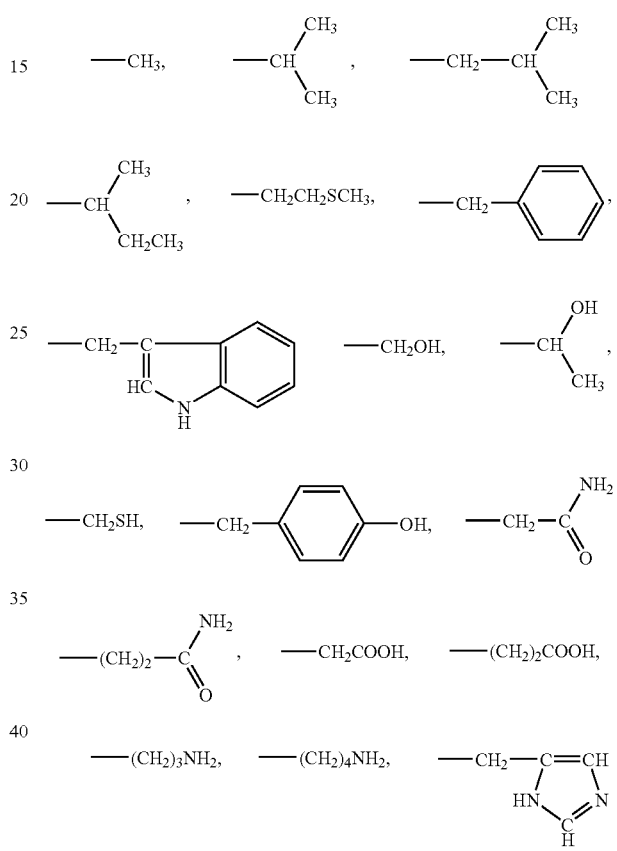

Re is a group identical with the long chain alkylene group (Re) above and the preferable groups thereof is also the same as those of Re above.

$R^4$ is a group identical with $R^1$ above. $R^4$ is preferably an alkyl group.

$R^5$ is a group identical with $R^3$ above. $R^5$ is preferably an alkylene group having no substituent group.

n is an integer of 0 to 3 and preferably 0 or 1.

Preferable typical examples of the aliphatic amide compounds (II) to (IV) include the following compounds:

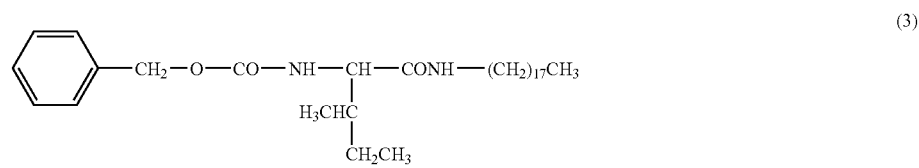

-continued

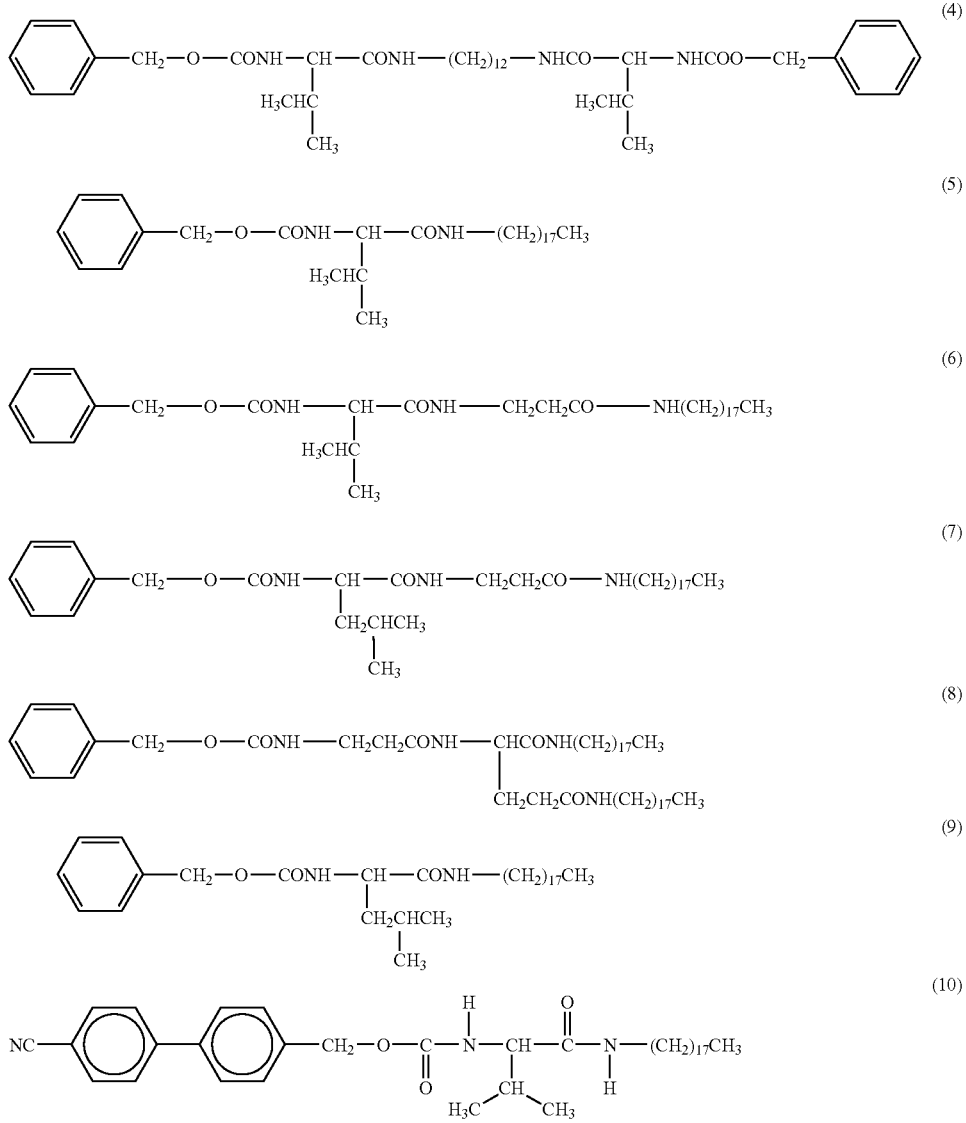

In Formula (V), $R^6$ is the same as $R^4$ above, and the preferable groups thereof are the same as those of $R^4$ above.

Re is a group identical with the long chain alkylene group (Re), and the preferable groups thereof are the same as those of Re above.

$R^7$ is the same as $R^5$ above, and the preferable groups thereof are the same as those of $R^5$ above.

Preferable typical examples of the aliphatic urea compounds (V) include the following compounds:

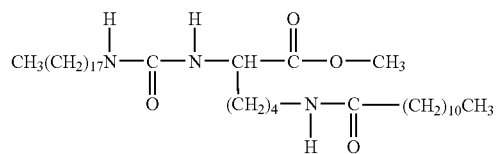

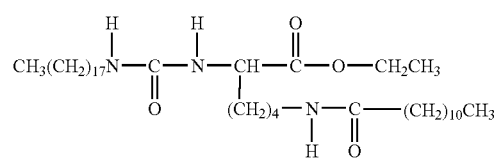

These compounds can be prepared by a known synthetic method.

Among the gelling agents above, the preferable gelling agent is an alicyclic amide compound (I).

The content of the gelling agent is not particularly limited when the object of the invention is attained, and, for example, it is favorably 1.0 to 4.0 wt % with respect to the total amount of the nematic liquid crystal, chiral agent, and gelling agent.

In the range above, it is possible to decrease the Y value during black display and consequently improve the contrast more efficiently.

The nematic liquid crystal is not particularly limited, and any one of the nematic liquid crystals known in the field of liquid crystal display device may be used. Examples of the nematic liquid crystal materials include liquid crystalline ester compounds, liquid crystalline pyrimidine compounds, liquid crystalline cyanobiphenyl compounds, liquid crystalline tolan compounds, liquid crystalline phenylcyclohexane compounds, and liquid crystalline terphenyl compounds, other liquid crystalline compounds containing fluorine atom or a polar group such as a fluoroalkyl group and a cyano group, and a mixture thereof, or the like.

Any one of various compounds known in the field of liquid crystal display device may be used as chiral agent. Examples thereof include cholesteric compounds having a cholesteric ring, biphenyl compounds having a biphenyl skeleton, terphenyl compounds having a terphenyl skeleton, ester compounds having a skeleton in which two benzene rings are connected to each other via an ester bond, cyclohexane compounds having a skeleton in which a cyclohexane ring is directly bound to a benzene ring, pyrimidine compounds having a skeleton in which a pyrimidine ring is directly bound to a benzene ring, azoxy or azo compounds having a skeleton in which two benzene rings are connected to each other via an azoxy or azo bond, and the like.

The content of the chiral agent is not particularly limited, but normally 3 to 40 wt % with respect to the total amount of the nematic liquid crystal, chiral agent and gelling agent.

The liquid crystal composition may contain other additives such as ultraviolet absorbent and others.

The ultraviolet absorbent is added for prevention of the degradation of liquid crystal composition by ultraviolet rays, such as discoloration and fluctuation in response with time. Examples thereof for use include benzophenone compounds, benzotriazole compounds, salicylate compounds, and the like. The addition amount is 5 wt % or less, preferably 3 wt % or less, with respect to the total amount of nematic liquid crystal, chiral agent and gelling agent.

The liquid crystal composition is preferably used in production of the device after it is brought into contact and purified with an ion-exchange resin, absorbent, or the like and water and impurities are removed.

When the liquid crystal composition is used in particular in a liquid crystal display device for black and white display, the peak wavelength of the selective reflection in the spectral distribution curve (wavelength-reflectance curve) of the display device in the planar state is preferably 500 to 700 nm and particularly 550 to 650 nm, for improving the contrast more efficiently.

The peak in the spectral distribution curve is a portion where the slope of the tangent line of curve changes from positive to negative when the wavelength is increased from the short wavelength side, and the wavelength of the peak point is the peak wavelength.

The phrase "when the device is in the planar state" means the state when a pulse voltage allowing the device to have the maximum Y value (brightness) is applied; and the wavelength-reflectance curve obtained from the device then is the spectral distribution curve in the planar state.

(Sealing Material)

The sealing material 12 is used for enclosing the liquid crystal composition 11 and thus preventing leakage thereof from between the substrates 1 and 2, and a thermosetting resin such as epoxy or acrylic resin a photo-curing adhesive, or the like can be used.

(Polymer Structure)

The shape of the polymer structure 10 is not limited and may be cylindrical column, cylindroid column, quadrangular prism, or the like and the arrangement thereof may be either random or ordered, for example, as in a lattice pattern. Presence of such a polymer structure makes it easier to maintain the gap between substrates to a constant value, and to preserve the original shape of liquid crystal display device consistently. In particular, polymer structures in the dot shape are effective in leveling display characteristics, when they are placed at a certain interval. The height of the polymer structure is equivalent to the thickness of cell gap, i.e., the thickness of the liquid crystal layer made of the liquid crystal composition. When a flexible resin substrate is used as the substrate holding the liquid crystal composition, it is quite effective to install the polymer structure. Presence of the structure prevents the fluctuation in the thickness of liquid crystal layer due to the flexibility of substrate. It is particularly effective in uniformizing the thickness of liquid crystal layer to use both a spherical spacer and a polymer structure and make the polymer structure have a function as an adhesive part for connecting the top and bottom substrates.

The polymer structure can be formed by the so-called photolithographic method in which a photocuring resin material such as photoresist material containing an ultraviolet ray-curing monomer is applied on the outmost layer of a substrate (insulating thin film, orientation film) to a desired thickness, a pattern exposure by irradiating ultraviolet ray thereon is performed through a mask, and the-unhardened region is removed.

Alternatively, the polymer structure of a thermoplastic resin may be formed by using a resin material containing the thermoplastic resin dissolved in a suitable solvent. In such a case, the polymer structure may be formed, for example, by a printing method of extruding a thermoplastic resin material onto a substrate with a squeegee through a screen plate, metal mask, or the like, a dispenser or inkjet method of ejecting a resin material through a nozzle onto a substrate, or a transfer method of supplying a resin material onto a flat plate or roller and then transferring it onto a substrate surface.

(Light-Scattering Layer)

A light-scattering layer (not shown in the Figure) may be formed on the surface of substrate 1 (top face in the Figure) and/or between the substrate 2 and the visible light-absorbing layer 9. Presence of the light-scattering layer improves the degree of dispersion and the brightness in the white display state. An example of the light-scattering layer is formed with FT-014 (trade name, manufactured by Polatechno Co., Ltd.).

Increase in the thickness of cell gap, i.e., the thickness of the liquid crystal layer made of the liquid crystal composition, in the liquid crystal display device is accompanied with increase in the reflectance during white display and also in operational voltage and reflectance during black display. Accordingly in the present embodiment, the thickness of cell gap may be 2 to 50 μm, but is preferably 3 to 15 μm. It is because it is possible to obtain a high contrast more effectively even at a relatively lower applied voltage in the preferable range above.

(Production Method)

In the present embodiment, the liquid crystal display device is produced by a method of heating the liquid crystal composition to a temperature of not lower than $T_{CN-I}$ and then cooling it to room temperature. Thus, the liquid crystal display device may be produced by any method when the liquid crystal composition is heated to a temperature of $T_{CN-I}$ or more and then cooled to room temperature in the production process.

For example in the first method, the liquid crystal composition is injected into an empty cell in a liquid crystal display device under vacuum and the injected hole is then sealed. In the first method, the liquid crystal composition may be heated before injection or heated by injecting it into the empty cell of a previously heated liquid crystal display device.

The empty cell in the liquid crystal display device can be formed by piling two substrates of the liquid crystal display device having particular constituent parts previously formed thereon in such a manner that the part-formed planes thereof face each other and then heating and/or pressurizing the substrates.

Alternatively, for example in the second method, the liquid crystal composition may be applied on one of the two substrate in the liquid crystal display device having the specified constituent parts previously formed, for example by using a coating machine such as spin coater, bar coater, or roll coater, or may be alternatively added simply dropwise thereon. Then, the liquid crystal composition is enclosed by placing another substrate and treating the composite under pressure and/or heat. In the second method, the liquid crystal composition may be heated previously or heated by at least one substrate that is previously heated.

In either case, the heating temperature of the liquid crystal composition is not lower than $T_{CN-I}$, preferably $T_{CN-I}$+5 to $T_{CN-I}$+30 (° C.), and more preferably $T_{CN-I}$+10 to $T_{CN-I}$+20 (° C.). The heating rate until the liquid crystal composition reaches the heating temperature is not particularly limited.

The liquid crystal composition is normally cooled to room temperature while it is left as it is. The room temperature is not particularly limited, but preferably 10 to 30° C. and particularly 20 to 30° C. The cooling rate of the liquid crystal composition to room temperature is not particularly limited when the object of the invention is achieved, and is, for example, 0.5 to 5.0° C./min and particularly preferably 0.5 to 2.0° C./min.

(Displaying Method)

In the liquid crystal display device in the construction above, displaying is enabled by applying a pulse voltage to the electrodes 3 and 4 from a drive circuit 20. For example, the display may be made in a PL-FC driving mode wherein the liquid crystal layer is switched between the planar and focal conic states, or in a PL-Homeo driving mode wherein the liquid crystal layer is switched between the planar and homeotropic states.

For example, in the PL-FC driving mode, the liquid crystal is converted into the planar state when a relatively high-energy pulse voltage (higher voltage, larger pulse width, or the like) is applied, and selectively reflects a light having the wavelength that is determined from the helical pitch and the refractive index of the liquid crystal molecule. On the other hand, the liquid crystal is converted into the transparent state when a relatively low-energy pulse voltage (low voltage, narrow pulse width, or the like) is applied, because the liquid crystal becomes in the focal conic state. There are several driving waveforms proposed, and for example, a driving waveform in which the liquid crystal is reset into the focal conic state by applying a relatively low voltage for a longer period, only a desired portion is converted into the planar state, a driving waveform in which after the liquid crystal is reset into the planar state by applying a high-voltage, then removing the voltage rapidly, and only a desired region is converted into the focal conic state, and a driving waveform in which a reset pulse is applied to the liquid crystal to be in homeotropic state, a selection pulse suitable for the desirable final display state is applied and a pulse is finally applied to establish a selected state. In these driving modes, displaying can be kept even after application and removal of a voltage by using the memorizability of the liquid crystal display device. When there is a visible light-absorbing layer 9, the device displays black in color in the focal conic state.

For example, in the PL-Homeo driving mode, the planar state is expressed by applying a high voltage and then removing the voltage rapidly and the homeotropic state of the liquid crystal is kept by applying the high voltage continuously. The transparency in the homeotropic state is higher than that in the focal conic state and thus the PL-Homeo driving mode is advantageous for improving contrast, but it is necessary to apply voltage continuously for keeping display. When there is a visible light-absorbing layer 9, the device also becomes black in color in the homeotropic state.

EXAMPLES (Measurement of Y Value (PL) and Y Value (FC))

Figure 2:
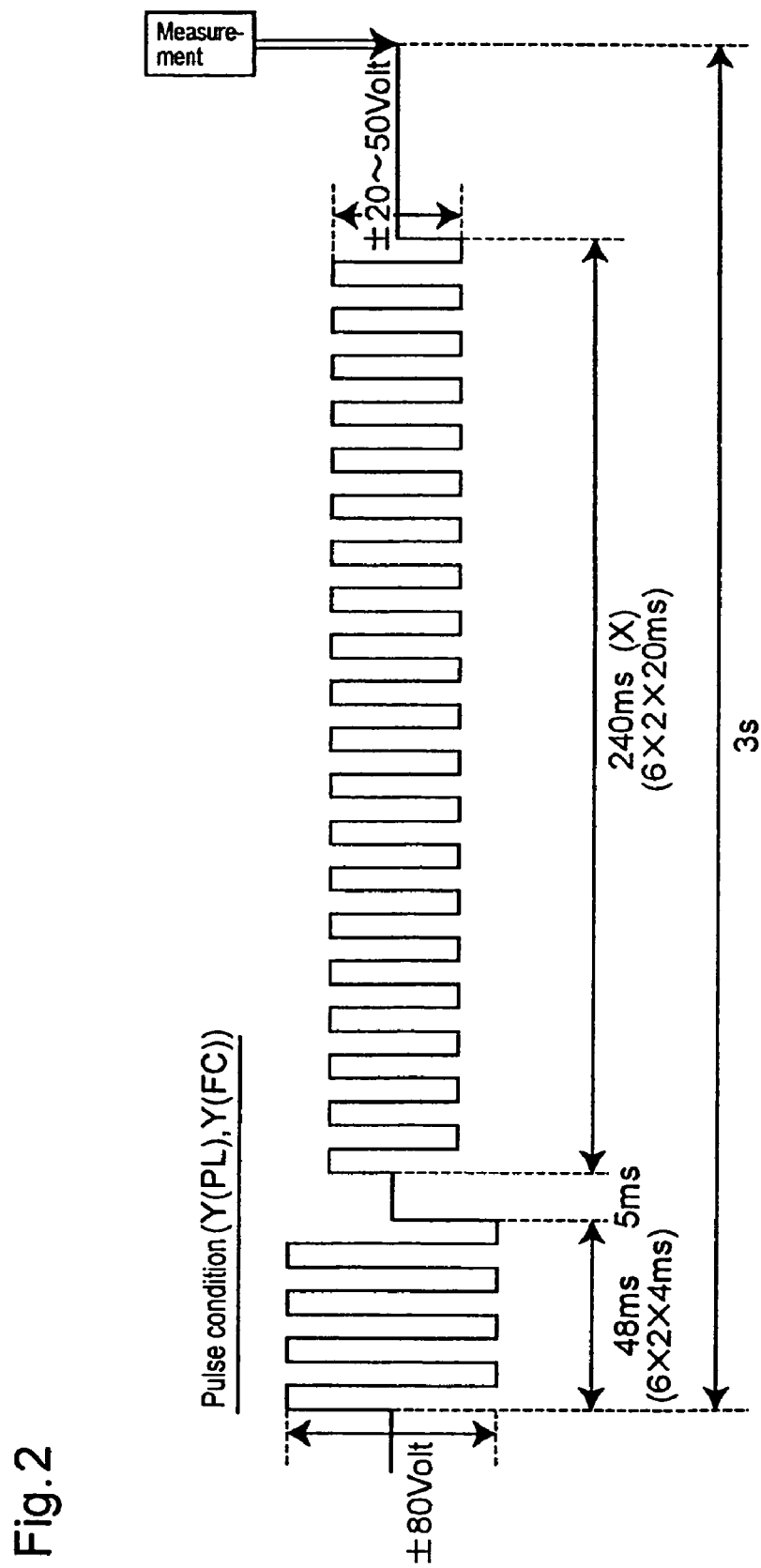
FIG. 2 is a view illustrating the driving waveform used in Examples.
Figure 3:
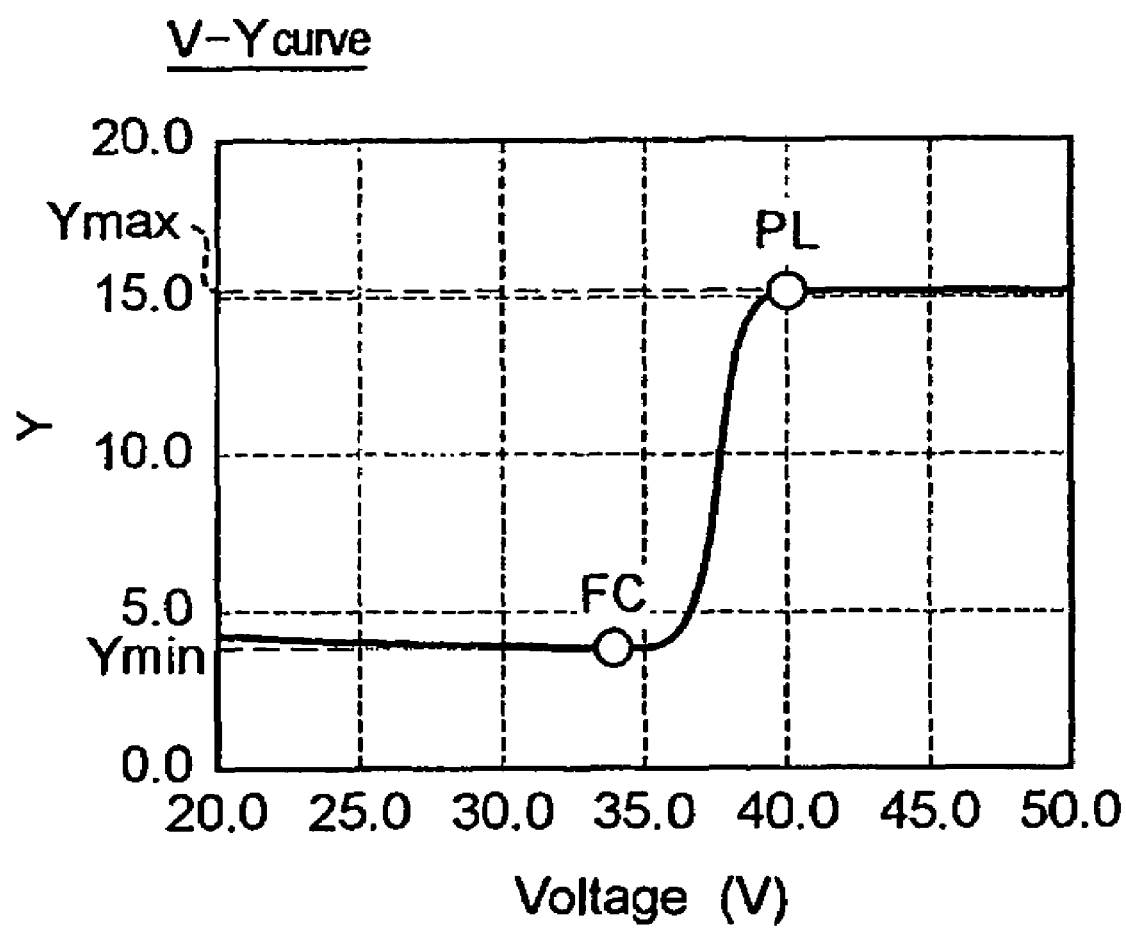
FIG. 3 is an example of a V-Y curve for determining the planar and focal conic states.

The pulse shown in FIG. 2 (in this driving waveform, the liquid crystal is reset once to the planar state by the pulses in the early stage) was applied to a display device and a voltage-Y value curve (hereinafter, referred to as V-Y curve) is obtained. Specifically, the spectral distribution curve (wavelength-reflectance curve) and the Y value (Y) of the device are determined several times repeatedly at the measuring point shown in the Figure by using a spectrophotometer (CM3700d; manufactured by Konica Minolta Sensing, Inc.), while changing the voltage (V) in the range (X) of the pulse in FIG. 2 from ±20 to ±50 V, and a V (absolute value of voltage)-Y (Y value) curve is prepared. An example of the V-Y curve is shown in FIG. 3. In the V-Y curve, the state having the maximum Y value (Ymax) is the planar state (PL), while the state having the minimum Y value (Ymin) the focal conic state (FC). The Y values thereof are designated respectively as Y value (PL) and Y value (FC). The contrast then can be represented by Y value (PL)/Y value (FC).

In the description below, "part" means "part by weight".

Example 1

A nematic liquid crystal (BL006; manufactured by Merck & Co., Inc., NI point=113° C., anisotropy of dielectric constant ($\Delta\epsilon$)=17.3, anisotropy of refractive index ($\Delta n$)=0.286) and a chiral agent (MLC6247; manufactured by Merck & Co., Inc.) were mixed. The amount of the chiral agent was determined in such a manner that the selective reflection wavelength (wavelength of the maximum peak in the spectral distribution curve when planar) becomes 580 nm. The ratio of liquid crystal/chiral agent was 64/36. The $T_{CN-I}$ of the chiral nematic liquid crystal obtained was 106° C.

Two parts of the gelling agent represented by the chemical formula (2) was added to 98 parts of the chiral nematic liquid crystal, and the mixture was mixed well to give a gelated chiral nematic liquid crystal composition A.

The display device shown in FIG. 1 (however, polymer structure and insulating thin film were eliminated) was prepared by using the gelated chiral nematic liquid crystal composition A and the materials shown below. Specifically, two substrates having the particular constituent parts shown below previously formed were first piled with their parts-formed planes facing each other and then heated and pressurized, to give an empty cell of liquid crystal display device. Then, the empty cell was heated with a hot plate to 121° C. ($T_{CN-I}$+15(° C.)) and the gelated chiral nematic liquid crystal composition was injected into the empty cell and the injection hole was sealed. The device was then left to cool to room temperature (25° C.), to give a liquid crystal display device. The cell gap was 6 μm. The cooling rate was 1.0° C./min.
Substrate: glass (thickness: 0.7 mm)
ITO sheet resistance: 10 Ω/□
Orientation film: vertically oriented polyimide (manufactured by JSR Corporation, thickness: 70 nm)
Spacer: retention spacer (Micropearl SP-205-KA, manufactured by Sekisui Fine Chemical, Co., Ltd., particle diameter: 6 μm)
Sealing material: thermosetting adhesive (1:1 mixture of ERS-2400(major agent) and ERS-2840 (hardener), manufactured by Sumitomo Bakelite)
Light-absorbing layer: black paint containing carbon black Example 2

A chiral nematic liquid crystal was obtained in a manner similar to Example 1, except that E44 (manufactured by Merck & Co., Inc., NI point=100° C., Δε=16.8, Δn=0.262) was used as the nematic liquid crystal. The ratio of nematic liquid crystal/chiral agent was 64/36/. $T_{CN-I}$ of the chiral nematic liquid crystal obtained was 92° C.

Two parts of the gelling agent represented by chemical formula (2) was added to 98 parts of the chiral nematic liquid crystal, and the mixture was mixed well to give a gelated chiral nematic liquid crystal composition B.

A liquid crystal display device was obtained in a manner similar to Example 1, except that the gelated chiral nematic liquid crystal composition B was used and the temperature of the hot plate was set to 107° C. ($T_{CN-I}$+15(° C.)).

Example 3

A chiral nematic liquid crystal was obtained in a manner similar to Example 1, except that BL035 (manufactured by Merck & Co., Inc., NI point=96° C., Δε=16.6, Δn=0.260) was used as the nematic liquid crystal. The ratio of nematic liquid crystal/chiral agent was 64/36. $T_{CN-I}$ of the chiral nematic liquid crystal-obtained was 85° C.

Two parts of the gelling agent represented by chemical formula (2) was added to 98 parts of the chiral nematic liquid crystal, and the mixture was mixed well to give a gelated chiral nematic liquid crystal composition C.

A liquid crystal display device was obtained in a manner similar to Example 1, except that the gelated chiral nematic liquid crystal composition C was used and the temperature of the hot plate was set to 100° C. ($T_{CN-I}$+15(° C.)).

Comparative Example 1

A chiral nematic liquid crystal was obtained in a manner similar to Example 1, except that BL035 (manufactured by Merck & Co., Inc., NI point=96° C., Δε=16.6, Δn=0.260) was used as the nematic liquid crystal. The ratio of nematic liquid crystal/chiral agent was 60/40. $T_{CN-I}$ of the chiral nematic liquid crystal obtained was 49.1° C.

Two parts of the gelling agent represented by chemical formula (2) was added to 98 parts of the chiral nematic liquid crystal, and the mixture was mixed well to give a gelated chiral nematic liquid crystal composition D.

A liquid crystal display device was obtained in a manner similar to Example 1, except that the gelated chiral nematic liquid crystal composition D was used and the temperature of the hot plate was set to 64.1° C. ($T_{CN-I}$+15(° C.)).

(Evaluation)

The Y value (PL) and Y value (FC) of the display devices obtained and the $T_{CN-I}$ and $T_{S-G}$ of the gelated chiral nematic liquid crystal compositions were measured according to the methods described above. These values were measured at 25° C.

TABLE 1

| | $T_{CN-I}$* (° C.) | $T_{S-G}$* (° C.) | Y Value (PL) | Y Value (FC) | Visibility** |
|---|---|---|---|---|---|
| Example 1 | 101~102 | 83~84 | 19.5 | 5.5 | ◎ (3.55) |
| Example 2 | 96~95 | 78~80 | 19.8 | 5.8 | ◎ (3.41) |
| Example 3 | 90~91 | 71~72 | 18.9 | 5.3 | ◎ (3.57) |
| Comparative Example 1 | 61~63 | 63~65 | 14.1 | 5.1 | xx (2.76) |

*Physical properties of gelated chiral nematic liquid crystal composition.
**The numeral value in the parentheses is "Y value (PL)/Y value (FC)".

The visibility was evaluated by examining the contrast of black and white display, based on the ratio of Y value (PL)/Y value (FC).

◉; a ratio of 3.40 or more, at a level at which the user feels that "the contrast is distinctively excellent".

◯; a ratio of 3.00 or more and less than 3.40, at a level at which the user feels that "the contrast is favorable".

X; a ratio of 2.80 or more and less than 3.00, at a level at which the user feels that "the contrast is poor".

XX; a ratio of less than 2.80, at a level at which the device cannot be brought into market.

Figure 4:
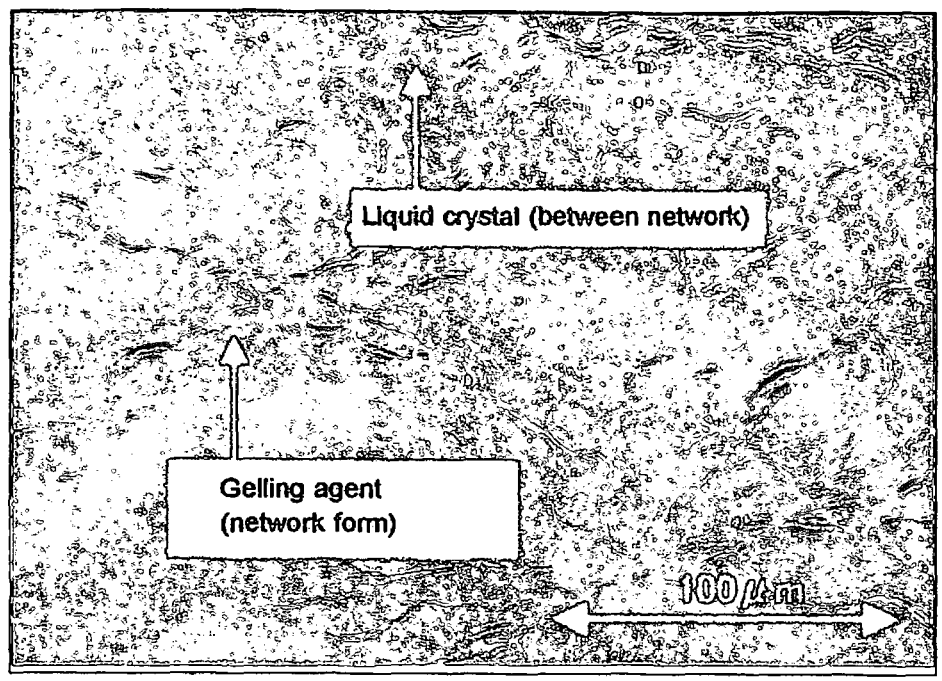
FIG. 4 is a micrograph showing the liquid crystal composition in Example 1.

A micrograph of the liquid crystal composition separated from the liquid crystal display device obtained in Example 1 is shown in FIG. 4 (BX50, manufactured by Olympus Corp). In FIG. 4, there are observed filamentous lines all over the surface, indicating that the gelling agent has a network structure.

Figure 5:
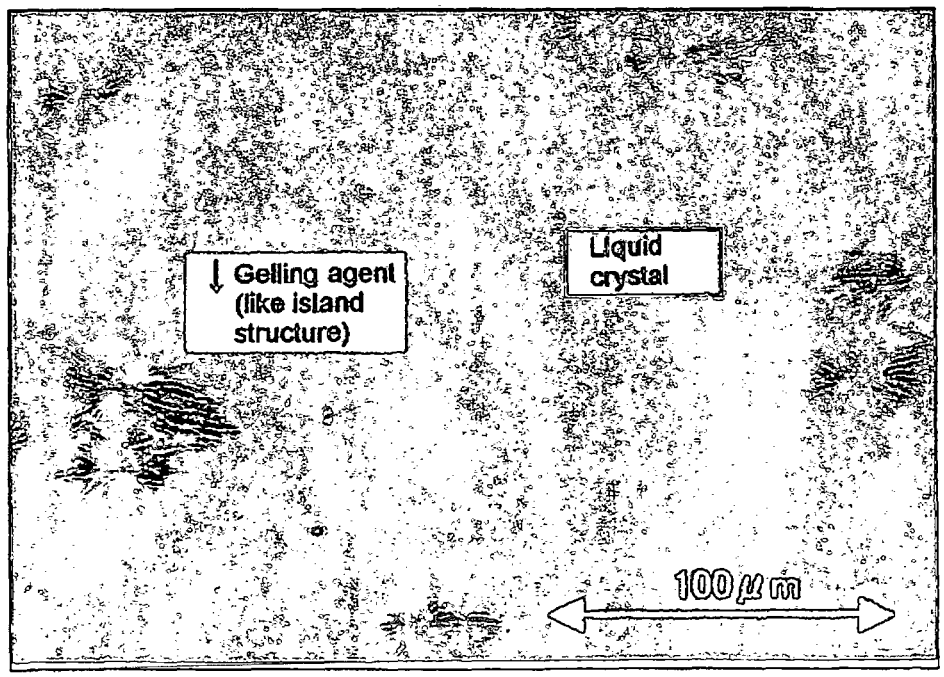
FIG. 5 is a micrograph showing the liquid crystal composition in Comparative Example 1.
Figure 6:
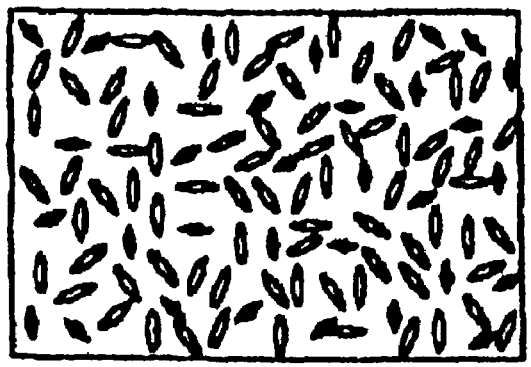
FIGS. 6(A) to 6(C) are schematic views illustrating the phase transition among isotropic phase (A), liquid crystal phase (B), and gelated state (C), when a liquid crystal composition prepared by a conventional method is cooled from a heated state to room temperature.
Figure 6:
Figure 6:
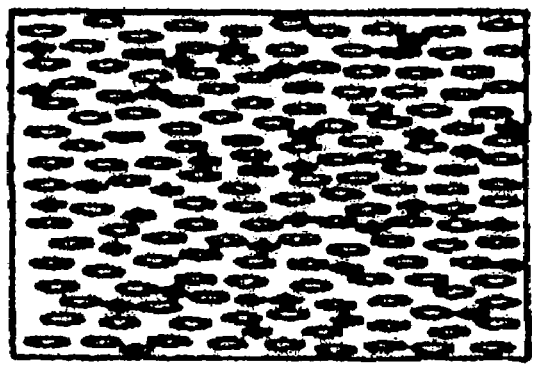
Figure 6:
Figure 6:
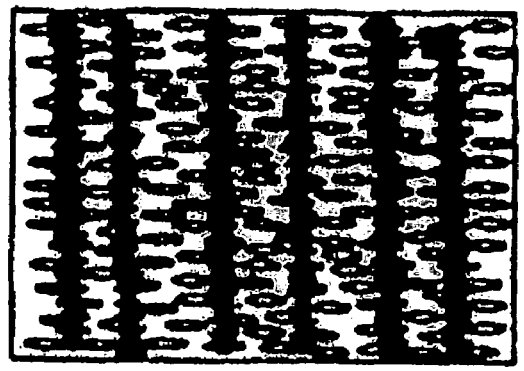

A micrograph of the liquid crystal composition separated from the liquid crystal display device obtained in Comparative Example 1 is shown in FIG. 5 (BX50, manufactured by Olympus Corp). In FIG. 5, there are filamentous lines observed partially, indicating that the gelling agent aggregated and isolated like an island structure.

Both micrographs are obtained at 25° C.

What is claimed is:

1. A chiral nematic liquid crystal composition, comprising a self-organizing gelling agent, wherein the phase transition temperature between liquid crystal and isotropic phases is higher than the sol-gel transition temperature.

2. The chiral nematic liquid crystal composition according to claim 1, wherein the phase transition temperature between liquid crystal and isotropic phases ($T_{CN-I}$ (° C.)) and the sol-gel transition temperature ($T_{S-G}$ (° C.)) satisfies the following relationship:

$$5 \leq T_{CN-I} - T_{S-G}.$$

3. The chiral nematic liquid crystal composition according to claim 1, wherein the phase transition temperature between liquid crystal and isotropic phases ($T_{CN-I}$ (° C.)) and the sol-gel transition temperature ($T_{S-G}$ (° C.)) satisfies the following relationship:

$$10 \leq T_{CN-I} - T_{S-G}.$$

4. The chiral nematic liquid crystal composition according to claim 1, wherein the self-organizing gelling agent is an organic compound containing at least an intermolecular hydrogen-bonding group.

5. The chiral nematic liquid crystal composition according to claim 1, wherein the self-organizing gelling agent is an organic compound containing at least an intermolecular hydrogen-bonding group and an alkylene group.

6. The chiral nematic liquid crystal composition according to claim 5, wherein the intermolecular hydrogen-bonding group is an amide bonding group.

7. The chiral nematic liquid crystal composition according to claim 5, wherein the alkylene group is a bivalent saturated hydrocarbon group having 4 or more carbons.

8. The chiral nematic liquid crystal composition according to claim 5, wherein two or more alkylene groups are contained in the molecule.

9. The chiral nematic liquid crystal composition according to claim 1, wherein a nematic liquid crystal and a chiral agent are contained and the content of the chiral agent is within the range between 3 to 40 wt % with respect to the total amount of the-nematic liquid crystal, chiral agent and gelling agent.

10. The chiral nematic liquid crystal composition according to claim 9, wherein the content of the gelling agent is within the range between 1.0 to 4.0 wt % with respect to the total amount of the nematic liquid crystal, chiral agent, and gelling agent.

11. A liquid crystal display device, wherein the chiral nematic liquid crystal composition according to claim 1 is put and held between a pair of substrates having an electrode.

12. The liquid crystal display device according to claim 11, wherein a visible light-absorbing layer is formed on the outer face of the substrate opposite to the observation side and the wavelength of selective reflection of the chiral nematic liquid crystal composition is within the range between 500 to 700 nm.

13. The liquid crystal display device according to claim 11, wherein a scattering layer is further formed.

14. A method of producing a liquid crystal display device, comprising: heating the-chiral nematic liquid crystal composition according to claim 1 to a temperature of not lower than the phase transition temperature between liquid crystal and isotropic phases, and then cooling it down to room temperature.

15. The method of producing a liquid crystal display device according to claim 14, wherein the heating temperature of the liquid crystal composition is within the range between $T_{CN-I}+5$ and $T_{CN-I}+30$ (° C.) in which $T_{CN-I}$ represents a phase transition temperature between liquid crystal and isotropic phases.

16. The method of producing a liquid crystal display device according to claim 14, wherein the cooling rate to room temperature is within the range between 0.5 to 5.0° C/min.

17. The method of producing a liquid crystal display device according to claim 14, wherein the liquid crystal composition is preheated and supplied on a substrate.

18. The method of producing a liquid crystal display device according to claim 14, wherein the liquid crystal composition is supplied on a preheated substrate.

* * * * *